United States Patent
Son et al.

(10) Patent No.: US 10,855,143 B2
(45) Date of Patent: Dec. 1, 2020

(54) POWER TRAIN INCLUDING CYLINDER BLOCK WATER JACKET HAVING MOTOR COOLING PORT

(71) Applicant: HYUNDAI MOTOR COMPANY, Seoul (KR)

(72) Inventors: You Sang Son, Suwon-si (KR); Ingee Suh, Yongin-si (KR); Jae Bum Park, Suwon-si (KR); Kyoung Pyo Ha, Seongnam-si (KR); Jeong Soo Eo, Hwaseong-si (KR); Back Sik Kim, Osan-si (KR); Yeon Ho Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 655 days.

(21) Appl. No.: 15/374,778

(22) Filed: Dec. 9, 2016

(65) Prior Publication Data
US 2018/0115217 A1    Apr. 26, 2018

(30) Foreign Application Priority Data
Oct. 24, 2016    (KR) .................. 10-2016-0138360

(51) Int. Cl.
*H02K 9/10*       (2006.01)
*H02K 7/00*       (2006.01)
(Continued)

(52) U.S. Cl.
CPC ............... *H02K 9/10* (2013.01); *B60K 6/24* (2013.01); *B60K 6/26* (2013.01); *B60K 6/405* (2013.01); *B60K 6/485* (2013.01); *F01P 3/02* (2013.01); *F01P 3/20* (2013.01); *F02B 63/04* (2013.01); *F02B 63/042* (2013.01); *F02B 75/18* (2013.01); *F02N 11/0851* (2013.01); *H02K 5/20* (2013.01);
(Continued)

(58) Field of Classification Search
None
See application file for complete search history.

(56) References Cited

U.S. PATENT DOCUMENTS

| 7,863,764 | B2 * | 1/2011 | Combs ................ B60K 6/40 |
| | | | 290/32 |
| 2004/0232702 | A1 * | 11/2004 | He ........................ H02K 7/00 |
| | | | 290/31 |

(Continued)

FOREIGN PATENT DOCUMENTS

| CN | 2137836 Y | 7/1993 |
| CN | 101964556 A | 2/2011 |

(Continued)

OTHER PUBLICATIONS

Office Action issued in corresponding Chinese Application No. 201611199833.0 dated Oct. 20, 2020.

*Primary Examiner* — Nguyen Tran
(74) *Attorney, Agent, or Firm* — Morgan, Lewis & Bockius LLP (57) ABSTRACT

A power train may include an engine including a crankshaft and an engine block, a rotor portion connected to the crankshaft and of which a magnet is connected to a first side thereof, a stator portion disposed between the rotor portion and the engine block and a cylinder block water jacket formed on the engine and to which a motor cooling port for cooling a motor is formed.

17 Claims, 12 Drawing Sheets

(51) Int. Cl.
    *H02K 9/19*      (2006.01)
    *H02K 5/20*      (2006.01)
    *F02B 63/04*     (2006.01)
    *H02K 21/24*     (2006.01)
    *B60K 6/24*      (2007.10)
    *B60K 6/405*     (2007.10)
    *B60K 6/26*      (2007.10)
    *B60K 6/485*     (2007.10)
    *F01P 3/02*      (2006.01)
    *F01P 3/20*      (2006.01)
    *F02B 75/18*     (2006.01)
    *F02N 11/08*     (2006.01)
    *B60K 6/48*      (2007.10)
(52) U.S. Cl.
    CPC ............... *H02K 7/006* (2013.01); *H02K 9/19* (2013.01); *H02K 21/24* (2013.01); *B60K 2006/268* (2013.01); *B60K 2006/4825* (2013.01); *B60Y 2200/92* (2013.01); *B60Y 2306/05* (2013.01); *F01P 2003/021* (2013.01); *F02B 2075/1808* (2013.01); *Y10S 903/906* (2013.01)

(56) References Cited

U.S. PATENT DOCUMENTS

| | | |
|---|---|---|
| 2009/0071784 A1 | 3/2009 | Combs et al. |
| 2012/0001504 A1* | 1/2012 | Erfanfar .................. B60K 6/40 310/54 |

FOREIGN PATENT DOCUMENTS

| | | |
|---|---|---|
| JP | 2012-080692 A | 4/2012 |
| KR | 20-0357587 Y1 | 7/2004 |
| KR | 10-2007-0119779 A | 12/2007 |
| KR | 10-2011-0006918 A | 1/2011 |
| KR | 10-2012-0048471 A | 5/2012 |
| KR | 10-2014-0105227 A | 9/2014 |

* cited by examiner

POWER TRAIN INCLUDING CYLINDER BLOCK WATER JACKET HAVING MOTOR COOLING PORT

CROSS-REFERENCE TO RELATED APPLICATION

This application claims the benefit of priority to Korean Patent Application No. 10-2016-0138360 filed in the Korean Intellectual Property Office on Oct. 24, 2016, the entire content of which is incorporated herein by reference.

TECHNICAL FIELD

The present disclosure relates to a power train. More particularly, the present disclosure relates to a power train provided with a 2-cylinder engine and a motor.

BACKGROUND

Recently, research has been undertaken to enhance fuel efficiency of a vehicle, various researches, such as by designing of a two cylinder engine or a three cylinder engine have been undertaken.

However, enhancing of output and fuel efficiency of the two cylinder engine or the three cylinder engine may be limited according to various vehicle driving conditions.

Further, the two cylinder engine or the three cylinder engine outputs relatively serious vibration and applying an element, such as a balance shaft, for suppressing vibration to the two cylinder engine or the three cylinder engine may be limited.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a power train provided with a 2-cylinder engine and a motor having advantages of reducing vibration and noise and enhancing fuel efficiency.

A power train according to an exemplary embodiment of the present disclosure may include an engine including a crankshaft and an engine block, a rotor portion connected to the crankshaft and of which a magnet is connected to a first side thereof, a stator portion disposed between the rotor portion and the engine block and a cylinder block water jacket formed on the engine and to which a motor cooling port for cooling a motor is formed.

The power train may further include a motor housing connected to the engine block and of which a housing hole is formed, wherein an inlet and an outlet for coolant from the motor cooling port to be flown may be formed on the motor housing for cooling the stator portion.

The stator portion may include a core plate of which the coil wraps along radial direction thereof and a stator plate on which a coil groove where the coil is inserted therein is formed.

A receiving portion for seating the stator portion may be formed on the motor housing.

The inlet may supply the coolant to the stator plate and the outlet may exhaust the coolant from the stator plate.

A cooling chamber may be formed within the stator plate along a radial direction thereof and the cooling chamber may communicate with the inlet and the outlet.

The power train may further include a transmission and a clutch selectively transmitting rotation of the rotor portion to the transmission.

The rotor portion may include a protrude portion connected to the crankshaft through the housing hole and a disk connected to the protrude portion and to which the magnet is connected.

A radiate portion may be formed on the rotor portion.

The radiate portion may be formed on an external circumference of the disk.

The radiate portion may have a concave shape to an external circumference of the disk.

A balance portion may be formed on the disk for compensating for imbalance rotational energy transmitted from the crankshaft.

The radiate portion may have a concave shape to an external circumference of the disk.

The balance portion may have a fan shape along a circumferential direction of the disk.

The balance portion may be made of a material of which density is lower than that of the disk.

The engine may be a two-cylinder engine and the balance portion may be formed at a position corresponding to a connecting rod journal of the crankshaft.

A power train according to another exemplary embodiment of the present disclosure may include an engine including a crankshaft and an engine block, a motor housing connected to the engine block and of which a housing hole is formed, a rotor portion connected to the crankshaft through the housing hole, of which a magnet is connected to a first side thereof and storing imbalance rotational energy transmitted from the crankshaft, a stator portion disposed between the rotor portion and the motor housing, connected to the motor housing and the stator portion including a core plate of which the coil wraps along radial direction thereof and a stator plate on which a coil groove where the coil is inserted therein is formed and a transmission connected to the engine block, wherein a cooling chamber may be formed on the stator plate.

An inlet and an outlet communicated with the cooling chamber for coolant to be flown may be formed on the motor housing.

The cooling chamber may be formed within the stator plate along a radial direction thereof.

The power train may further include a cylinder block water jacket formed on the engine and to which a motor cooling port communicated with the inlet.

As described above, the power train provided with a 2-cylinder engine and a motor according to an exemplary embodiment of the present disclosure may reduce vibration and noise and enhance fuel efficiency and also a size of the engine may be reduced.

Since a motor cooling port is formed on a cylinder block water jacket for cooling a motor, thus additional cooling lines are not required.

DETAILED DESCRIPTION OF THE EMBODIMENTS

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure.

A part irrelevant to the description will be omitted to clearly describe the present disclosure, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary embodiment of the present disclosure will hereinafter be described in detail with reference to the accompanying drawings.

Figure 1:
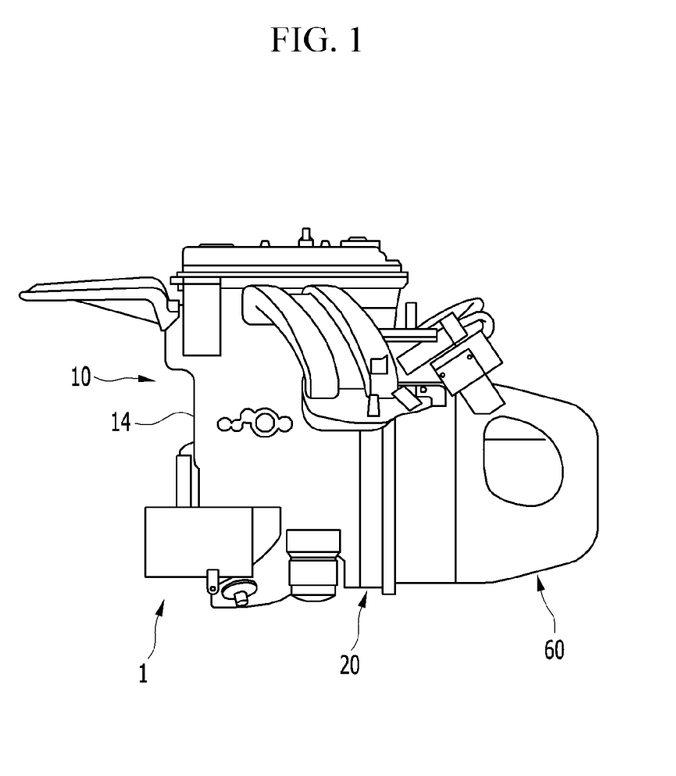
FIG. 1 is a front view of a power train according to an exemplary embodiment of the present disclosure.
Figure 2:
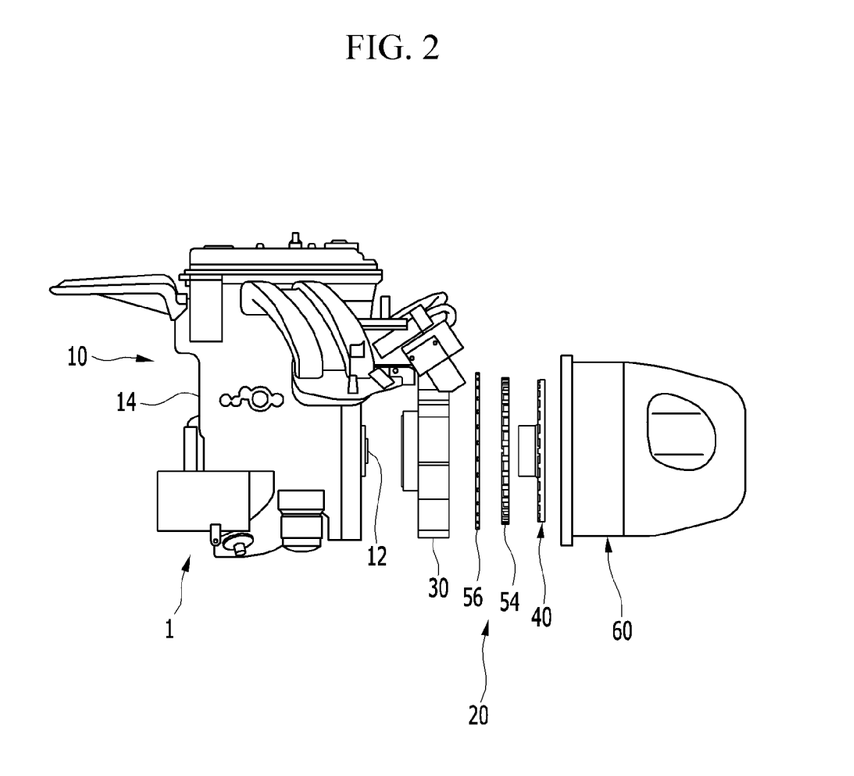
FIG. 2 is an exploded view of a power train according to an exemplary embodiment of the present disclosure.
Figure 3:
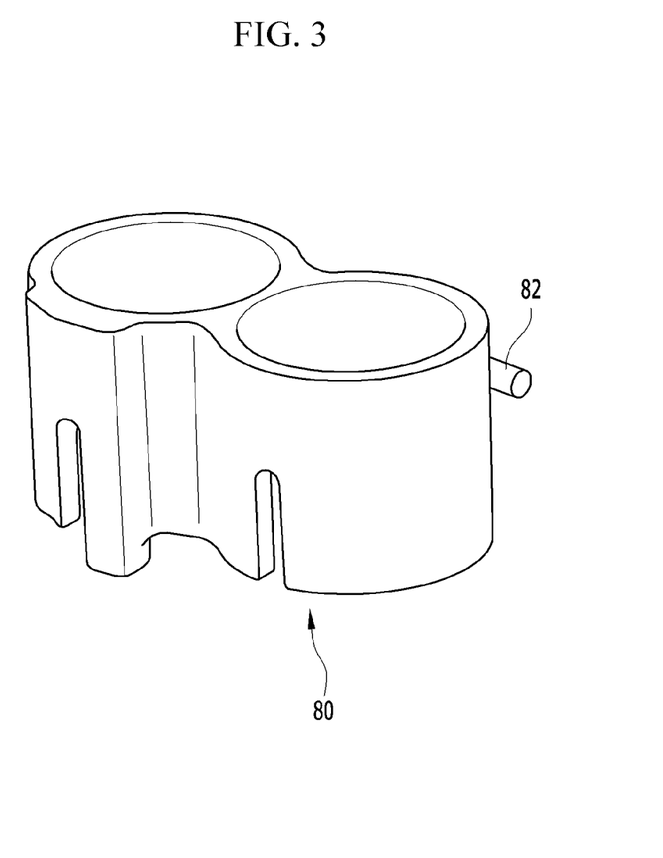
FIG. 3 is a perspective view of a cylinder block water jacket of a power train according to an exemplary embodiment of the present disclosure.

FIG. 1 is a front view of a power train according to an exemplary embodiment of the present disclosure, FIG. 2 is an exploded view of a power train according to an exemplary embodiment of the present disclosure, and FIG. 3 is a perspective view of a cylinder block water jacket of a power train according to an exemplary embodiment of the present disclosure.

Figure 4:
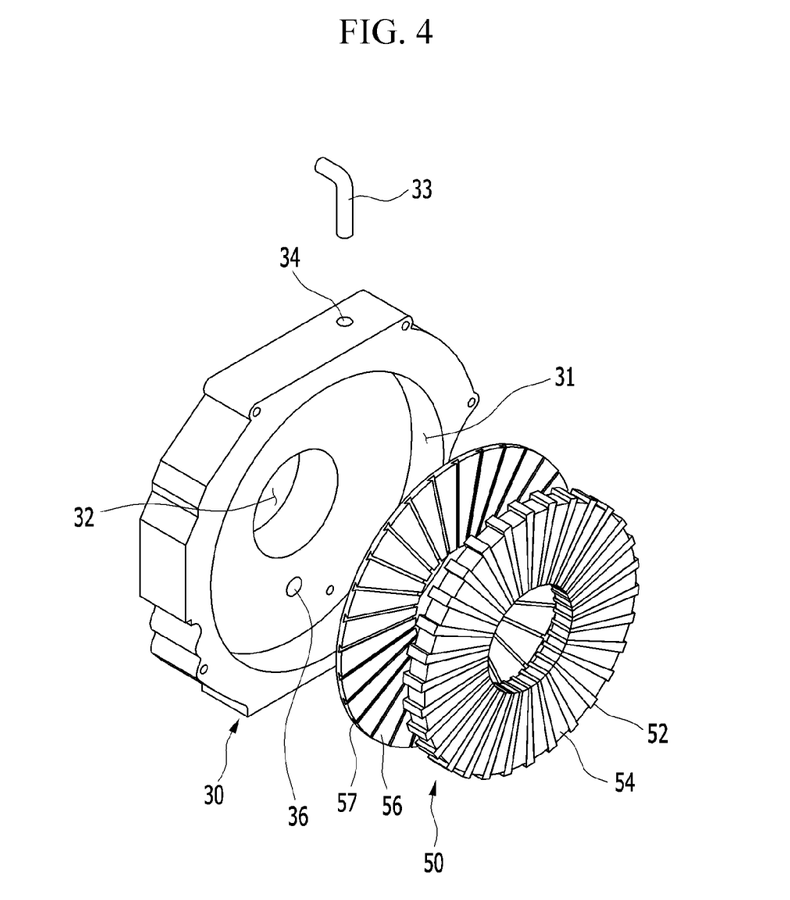
FIG. 4 is an exploded perspective view of a stator portion of a power train according to an exemplary embodiment of the present disclosure.
Figure 5:
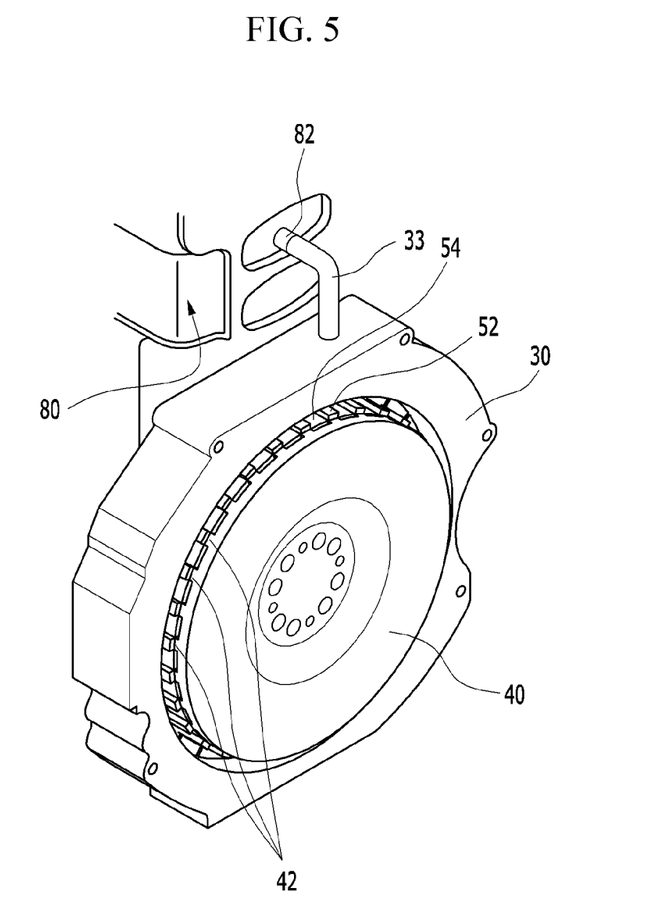
FIG. 5 is a partial perspective view of a stator portion of a power train according to an exemplary embodiment of the present disclosure.

FIG. 4 is an exploded perspective view of a stator portion of a power train according to an exemplary embodiment of the present disclosure, and FIG. 5 is a partial perspective view of a stator portion of a power train according to an exemplary embodiment of the present disclosure.

Referring to FIG. 1 to FIG. 5, a power train 1 according to an exemplary embodiment of the present disclosure may include an engine 10 including a crankshaft 12 and an engine block 14, a rotor portion 40 connected to the crankshaft 12 and of which a magnet 42 is connected to a first side thereof, a stator portion 50 disposed between the rotor portion 40 and the engine block 14 and a cylinder block water jacket 80 formed on the engine 10 and to which a motor cooling port 82 for cooling a motor is formed.

A motor housing 30 on which a housing hole 32 is formed is connected to the engine block 14.

The rotor portion 40 includes a protrude portion 45 connected to the crankshaft 12 through the housing hole 32 and a disk 41 connected to the protrude portion 45 and to which the magnet 42 is connected.

In an exemplary embodiment of the present disclosure, the power train further includes a transmission 60 and a clutch 70 selectively transmitting rotation of the rotor portion 40 to the transmission 60.

In an exemplary embodiment of the present disclosure, the power train 1 includes a motor/rotor portion 20 disposed between the engine 10 and the transmission 60 and functioning as a flywheel and a motor, and thus, the motor/rotor portion 20 may reduce vibration of the engine 10 and assists outputs of the engine 10.

In this case, the motor/rotor portion 20 includes the rotor portion 40 and the stator portion 50.

The rotor portion 40 is directly connected with the crankshaft 12 and stores rotational energy of the crankshaft 12 functioning as a flywheel such that the rotator portion 40 may reduce vibration of the engine 10.

The stator portion 50 and the rotor portion 40 may function as a motor for assisting output of the engine 10 and may be a main driving power source when the engine 10 is not operated. Further, the stator portion 50 and the rotor portion 40 output a compensation torque corresponding to vibration of the engine 10 so that the stator portion 50 and the rotor portion 40 may function as a balance weight.

The stator portion 50 includes a core plate 54 of which the coil 52 wraps along a radial direction thereof and a stator plate 56 on which a coil groove 57 where the coil 52 is inserted therein is formed. The stator plate 56 is connected to the motor housing 30.

A receiving portion 31 for seating the stator portion 50 may be formed on the motor housing 30, and thus, an increase in length of the motor/rotor portion 20 may be suppressed.

The motor housing 30 and the stator plate 56 may be assembled by a bolt such that assembly and disassembly may be easily performed.

Since the stator portion 50 is disposed between the rotor portion 40 and the motor housing 30, thus assembly may be easily performed, and thus, the motor/rotor portion 20 may be stable.

Since the coil 52 is inserted into the coil groove 57, the coil 52 may be stably fixed at a predetermined position without additional parts.

That is, the magnet 42 and the coil 52 are disposed along radial direction, and thus, the increase in the length of the motor/rotor portion 20 may be suppressed.

An inlet 34 and an outlet 36 for coolant from the motor cooling port 82 to be flown are formed on the motor housing 30 for cooling the stator portion 50.

A connection pipe 33 connected with the motor cooling port 82 may be inserted into the inlet 34.

The inlet 34 supplies the coolant to the stator plate 56 and the outlet 36 exhaust the coolant from the stator plate 56.

Figure 6:
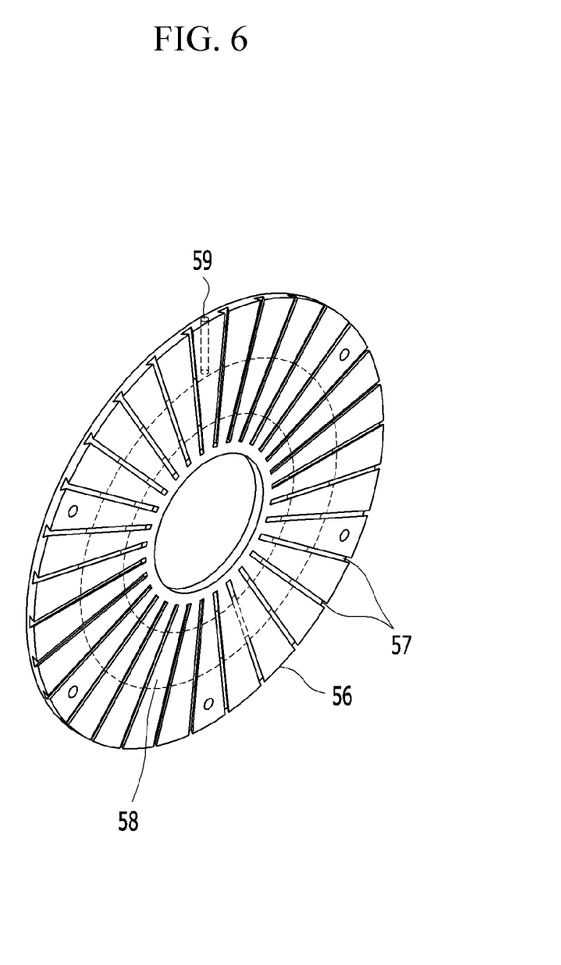
FIG. 6 is a perspective view of a stator plate of a power train according to an exemplary embodiment of the present disclosure.
Figure 7:
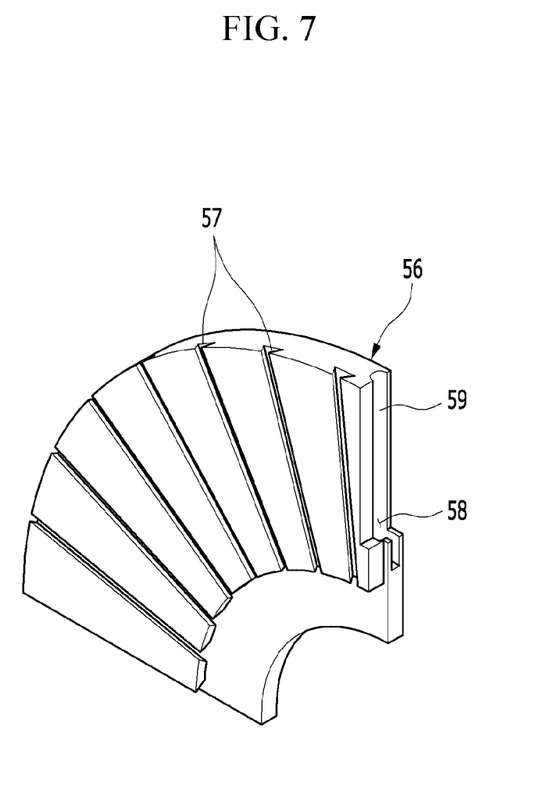
FIG. 7 is a partial cross-sectional view of a stator plate of a power train according to an exemplary embodiment of the present disclosure.

FIG. 6 is a perspective view of a stator plate of a power train according to an exemplary embodiment of the present disclosure, and FIG. 7 is a partial cross-sectional view of a stator plate of a power train according to an exemplary embodiment of the present disclosure.

Referring to FIG. 6 and FIG. 7, a cooling chamber 58 is formed within the stator plate 56 along a radial direction thereof, and the cooling chamber 58 communicates with the outlet 36 and communicates with the inlet 34 through a cooling chamber inlet 59 formed on the stator plate 56.

Figure 8:
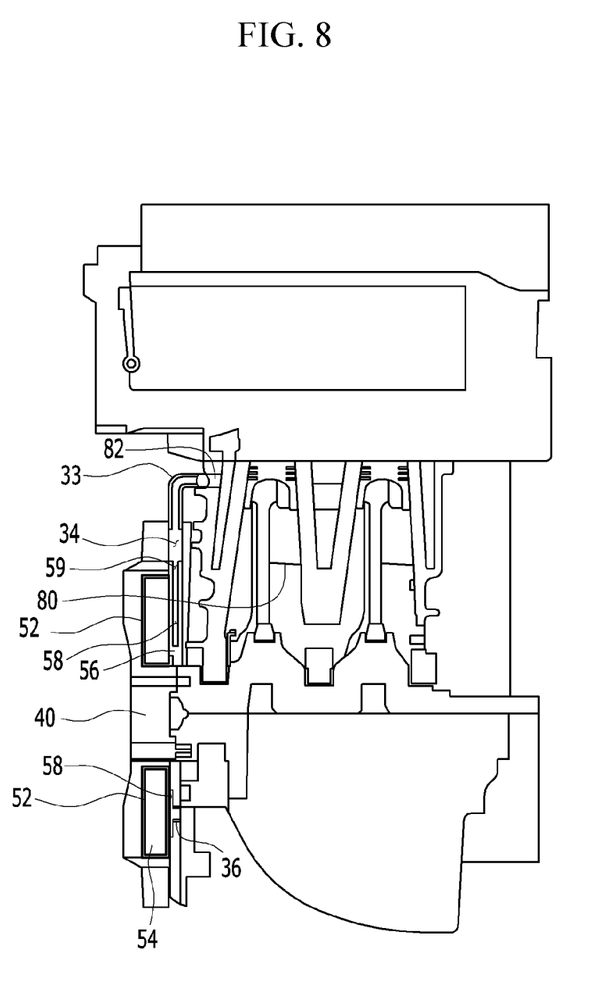
FIG. 8 is a cross sectional view of an engine of a power train according to an exemplary embodiment of the present disclosure.

FIG. 8 is a cross sectional view of an engine of a power train according to an exemplary embodiment of the present disclosure.

Referring to FIG. 1 to FIG. 8, cooling of the motor will be described.

Coolant is supplied from a water pump to the cylinder block water jacket 80 and a part of the coolant is supplied to the cooling chamber 58 through the motor cooling port 82, the connection pipe 33, the inlet 34 and the cooling chamber inlet 59.

The coolant supplied to the cooling chamber 85 cools the stator plate 56 and the coil 52 connected with the stator plate 56.

The coolant within the cooling chamber 58 is exhausted through the outlet 36.

Figure 9:
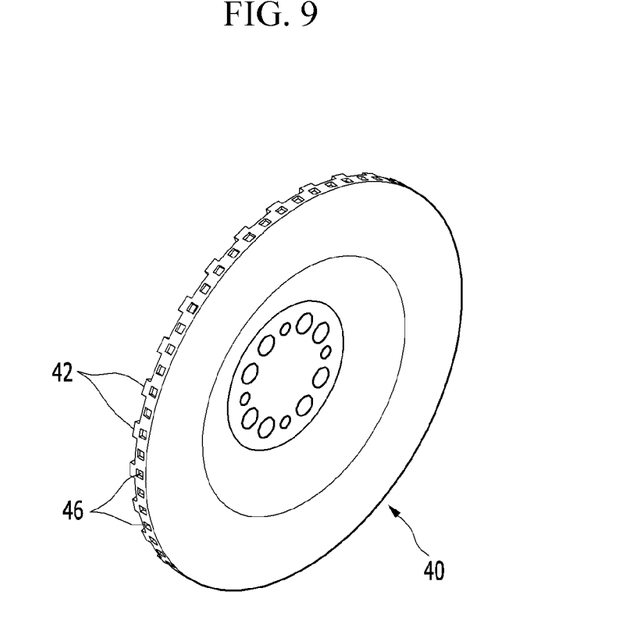
FIG. 9 is a perspective view of a rotor portion of a power train according to an exemplary embodiment of the present disclosure.
Figure 10:
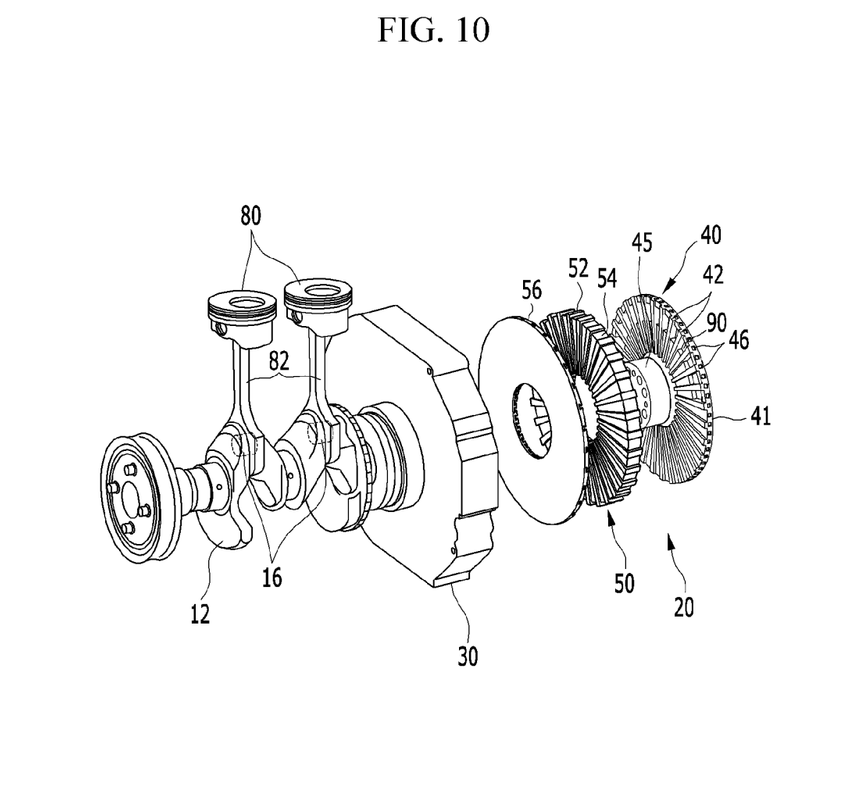
FIG. 10 is a partial exploded perspective view of a power train according to an exemplary embodiment of the present disclosure.
Figure 11:
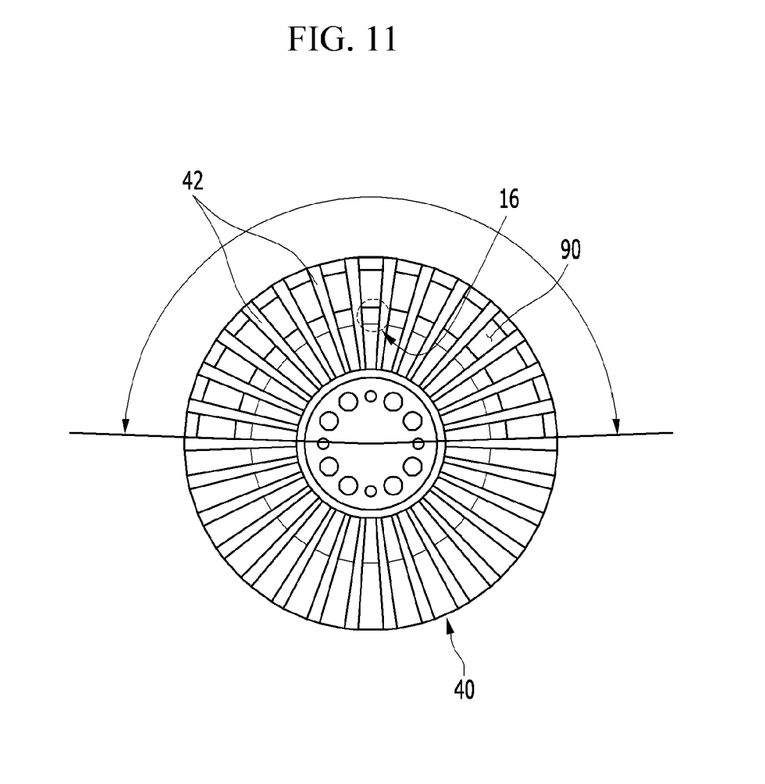
FIG. 11 is a front view of a rotor portion of a power train according to an exemplary embodiment of the present disclosure.

FIG. 9 is a perspective view of a rotor portion of a power train according to an exemplary embodiment of the present disclosure, FIG. 10 is a partial exploded perspective view of a power train according to an exemplary embodiment of the present disclosure, and FIG. 11 is a front view of a rotor portion of a power train according to an exemplary embodiment of the present disclosure.

For easy comprehension, the same or similar elements of the power train described in FIG. 1 to FIG. 6 will be designated by the same reference numerals and repeated description will be omitted.

A radiate portion 46 is formed on the rotor portion 40.

The radiate portion 46 is formed on an external circumference of the rotor portion 40.

The radiate portion 46 has a concave shape to the external circumference of the rotor portion 40.

That is, as shown in FIG. 9, since the radiate portion 46 is formed as the concave shape to the external circumference of the rotor portion 40 and thus manufacturing process of the rotor portion is simplified. The rotor portion 40 may circulate air surround the rotor portion 40 to cool the rotor portion 40. A surface area of the rotor portion 40 is increased due to the radiate portion 46, and thus, heat transfer of the rotor portion 40 is increased.

A balance portion 90 is formed on the rotor portion 40 for compensating for imbalance rotational energy transmitted from the crankshaft 12.

The rotor portion 40 is shaped as a disk shape and the balance portion 90 is formed on a first side of the rotor portion 40 as a concave shape.

That is, the balance portion 90 may be a space function as a balance weight having negative value. Thus, total weight of the rotor portion 40 may be reduced such that the rotor portion 40 may be highly efficient in high speed.

The balance portion 90 is formed as a fan shape along a circumferential direction of the rotor portion 40.

Thus, cross section along a diameter direction of the rotor portion 40 may be simplified and be highly efficient in productivity.

In a modified exemplary embodiment, the balance portion 40 may be made of a material of which density is lower than that of the disk 41 of the rotor portion 40. Thus, rigidity of the rotor portion 40 may be maintained.

The balance portion 90 is formed at a position corresponding to a connecting rod journal 16 of the crankshaft 12.

A connecting rod 82 is connected with the connecting rod journal 16 and also connected with a piston 80. The balance portion 90 is formed at the position corresponding to the connecting rod journal 16 of the crankshaft 12 for compensating for the imbalance rotational energy transmitted from the crankshaft 12.

A shape of the balance portion 90, that is "a" shown in FIG. 11 may be determined according to imbalance force due to reciprocal motion of the piston 80.

Figure 12:
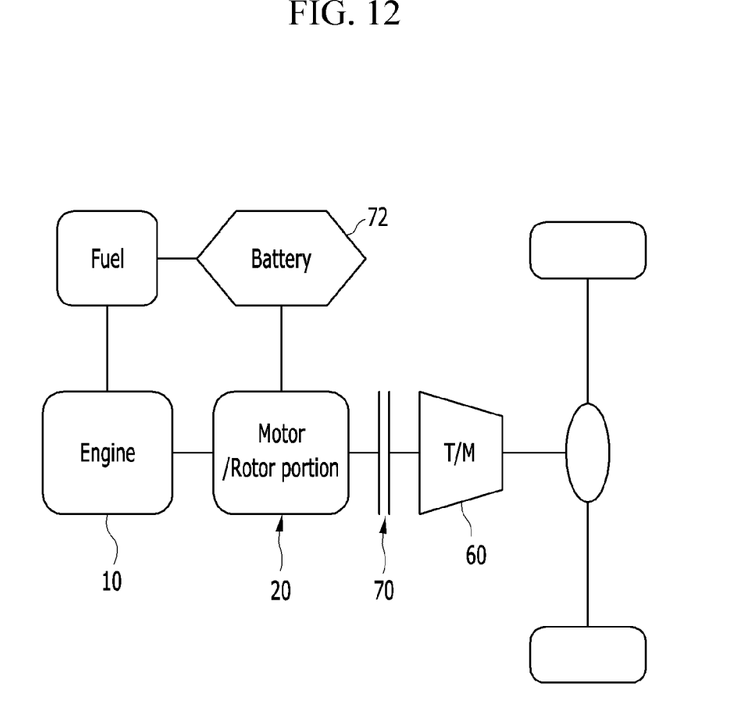
FIG. 12 is a schematic diagram of a power train according to an exemplary embodiment of the present disclosure.

FIG. 12 is a schematic diagram of a power train according to an exemplary embodiment of the present disclosure.

Referring to FIG. 12, in the exemplary embodiment of the present disclosure, the engine 10 is directly connected with the motor/rotor portion 20 and the clutch 70 is disposed between the transmission 60 and the rotor portion 40 for selectively connecting the transmission 60 with the rotor portion 40.

According to the connection state of the clutch 70, the motor/rotor portion 20 may function as a starter motor by supplied electric power from a battery 72, and also may function as a driving power source assisting the engine 10.

The motor/rotor portion 20 may function as a generator when assisting power is not required and the generated electric power is stored in the battery 72.

As described above, the power train provided with a 2-cylinder engine and a motor according to an exemplary embodiment of the present disclosure may reduce vibration and noise and enhance fuel efficiency and also a size of the engine may be reduced.

Since a motor cooling port is formed to a cylinder block water jacket for cooling a motor, and thus, additional cooling lines are not required.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A power train comprising:
    an engine including a crankshaft and an engine block;
    a rotor portion connected to the crankshaft and of which a magnet is connected to a first side of the rotor portion;
    a stator portion disposed between the rotor portion and the engine block;
    a cylinder block water jacket disposed on the engine, the cylinder block water jacket having a motor cooling port for cooling a motor; and
    a motor housing connected to the engine block and having a housing hole,
    wherein the motor housing includes an inlet through which coolant flows from the motor cooling port into the motor housing and an outlet through which coolant exits the motor housing, for cooling the stator portion, and
    wherein the rotor portion comprises:
        a protrude portion connected to the crankshaft through the housing hole; and
        a disk connected to the protrude portion and to which the magnet is connected.

2. The power train of claim 1, wherein the stator portion comprises:
 a core plate of which a coil wraps along a radial direction of the core plate; and
 a stator plate having a coil groove, into which the coil is inserted.

3. The power train of claim 1, wherein the motor housing further includes a receiving portion for seating the stator portion.

4. The power train of claim 2, wherein:
 the inlet supplies the coolant to the stator plate; and
 the outlet exhausts the coolant from the stator plate.

5. The power train of claim 2, wherein:
 the stator plate includes a cooling chamber therein along a radial direction of the stator plate; and
 the cooling chamber communicates with the inlet and the outlet.

6. The power train of claim 1, further comprising:
 a transmission; and
 a clutch selectively transmitting rotation of the rotor portion to the transmission.

7. The power train of claim 1, wherein the rotor portion includes a radiate portion.

8. The power train of claim 7, wherein the radiate portion is disposed on an external circumference of the disk.

9. The power train of claim 7, wherein the radiate portion has a concave shape to an external circumference of the disk.

10. The power train of claim 1, wherein the disk includes a balance portion for compensating for imbalance rotational energy transmitted from the crankshaft.

11. The power train of claim 10, wherein the radiate portion has a concave shape to an external circumference of the disk.

12. The power train of claim 11, wherein the balance portion has a fan shape along a circumferential direction of the disk.

13. The power train of claim 11, wherein the balance portion is made of a material of which density is lower than that of the disk.

14. The power train of claim 10, wherein:
 the engine is a two-cylinder engine; and
 the balance portion is disposed at a position corresponding to a connecting rod journal of the crankshaft.

15. A power train comprising:
 an engine including a crankshaft and an engine block;
 a motor housing connected to the engine block and having a housing hole;
 a rotor portion connected to the crankshaft through the housing hole, of which a magnet is connected to a first side thereof and storing imbalance rotational energy transmitted from the crankshaft;
 a stator portion disposed between the rotor portion and the motor housing, connected to the motor housing, the stator portion including: a core plate of which the coil wraps along radial direction thereof; and a stator plate having a coil groove into which the coil is inserted; and
 a transmission connected to the engine block,
 wherein the stator plate has a cooling chamber therein, and
 wherein the motor housing includes an inlet through which coolant flows into the motor housing and an outlet through which coolant exits the motor housing, the inlet and the outlet communicating with the cooling chamber,
 wherein the rotor portion comprises:
  a protrude portion connected to the crankshaft through the housing hole; and
  a disk connected to the protrude portion and to which the magnet is connected.

16. The power train of claim 15, wherein the stator plate includes the cooling chamber therein along a radial direction of the stator plate.

17. The power train of claim 15, further comprising a cylinder block water jacket disposed on the engine and through which a motor cooling port communicated with the inlet.

* * * * *